(12) United States Patent
Walters et al.

(10) Patent No.: US 11,711,449 B2
(45) Date of Patent: Jul. 25, 2023

(54) COMPRESSING WEBSITES FOR FAST DATA TRANSFERS

(71) Applicant: Capital One Services, LLC, McLean, VA (US)

(72) Inventors: Austin Walters, Savoy, IL (US); Vincent Pham, Seattle, WA (US); Jeremy Goodsitt, Champaign, IL (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 17/544,576

(22) Filed: Dec. 7, 2021

(65) Prior Publication Data

US 2023/0179684 A1 Jun. 8, 2023

(51) Int. Cl.
| | |
|---|---|
| *G06F 15/16* | (2006.01) |
| *H04L 69/04* | (2022.01) |
| *H04L 9/08* | (2006.01) |
| *H04L 9/32* | (2006.01) |
| *H04L 67/02* | (2022.01) |

(52) U.S. Cl.
CPC ............ *H04L 69/04* (2013.01); *H04L 9/0819* (2013.01); *H04L 9/3247* (2013.01); *H04L 67/02* (2013.01)

(58) Field of Classification Search
CPC ......... H04L 67/02; H04L 69/22; H04L 69/04; H04N 19/463; G06N 3/0454; G06N 20/00; G06V 10/82
See application file for complete search history.

(56) References Cited

U.S. PATENT DOCUMENTS

| | | | |
|---|---|---|---|
| 7,212,974 B2 | 5/2007 | Kilbank | |
| 8,184,692 B2 | 5/2012 | Valenzuela et al. | |
| 8,650,264 B2 | 2/2014 | Zilliacus et al. | |
| 8,966,123 B2* | 2/2015 | Gochi Garcia | ..... H04L 67/5651 |
| | | | 370/389 |
| 9,208,250 B2* | 12/2015 | Gupta | ..................... H04L 67/02 |
| 9,648,096 B2 | 5/2017 | Kasatani | |
| 9,817,916 B2* | 11/2017 | Flack | ...................... H04L 67/02 |
| 10,306,024 B2 | 5/2019 | Schurman et al. | |

(Continued)

FOREIGN PATENT DOCUMENTS

| | | |
|---|---|---|
| CN | 109615048 | 4/2019 |
| CN | 112929666 | 6/2021 |

(Continued)

*Primary Examiner* — Chirag R Patel
(74) *Attorney, Agent, or Firm* — Perkins Coie LLP

(57) ABSTRACT

A system encodes/compresses at least some portion of website data and transmits the encoded website data to a remote user. A storage device stores original website data representing an original webpage. Retrieval logic retrieves the original website data from the storage device. The retrieval may be responsive to a request from an electronic user device. A parser parses the original website data to detect and tag at least one type of website code within the website data. An encoder encodes the tagged website data and produces encoded website data representing the original website data. A transmitter transmits the encoded website data to the electronic user device. The electronic user device has previously been provided a decoder from the system to decode the encoded website data to recover the original website data. This allows the electronic user device to display the website on the electronic user device.

19 Claims, 10 Drawing Sheets

(56) References Cited

U.S. PATENT DOCUMENTS

| | | | |
|---|---|---|---|
| 10,594,338 B1 | 3/2020 | Lew et al. | |
| 10,860,929 B2 | 12/2020 | Rippel et al. | |
| 10,904,637 B2 | 1/2021 | Hwang et al. | |
| 10,958,908 B2 | 3/2021 | Grois et al. | |
| 11,062,211 B2 | 7/2021 | Rippel et al. | |
| 2007/0058803 A1* | 3/2007 | Suga | H04L 63/12 |
| | | | 380/30 |
| 2010/0223398 A1* | 9/2010 | Ahmed | H03M 7/30 |
| | | | 709/247 |
| 2014/0201126 A1* | 7/2014 | Zadeh | A61B 5/7221 |
| | | | 706/52 |
| 2017/0171104 A1* | 6/2017 | Zhou | H04L 67/02 |
| 2020/0099958 A1* | 3/2020 | Satpathy | H04N 19/13 |
| 2020/0285690 A1 | 9/2020 | Akima | |

FOREIGN PATENT DOCUMENTS

| | | |
|---|---|---|
| JP | 2004310490 | 11/2004 |
| WO | 2018171596 | 9/2018 |
| WO | 2021022685 | 2/2021 |

* cited by examiner

COMPRESSING WEBSITES FOR FAST DATA TRANSFERS

BACKGROUND

Various systems transmit information to and from one another over a network. Often data is stored in an entire file as compressed information for later access. The information may be, for example, content such as an image or video, audio, or a string of text such as an e-mail, a text document, a PDF file, or another file type. Typically, a sender compresses the information into a single file of compressed code such that the compressed code can be efficiently transmitted to the receiver. The receiver can then decode the compressed code to reconstruct the original information. For example, responsive to a request to download a particular data file from a client device, a file sharing website may encode the file into a single file of compressed code and transmit the compressed code to the client device. The client device may then decode the compressed code to recover the original data file.

SUMMARY

The following presents a simplified summary to provide a basic understanding of some aspects of the disclosed subject matter. This summary is not an extensive overview. It is not intended to identify key/critical elements or to delineate the scope of the claimed subject matter. Its sole purpose is to present some concepts in a simplified form as a prelude to the more detailed description presented later.

Briefly described, the subject disclosure pertains to a system for compressing website data for fast data transfer. The website data may be encoded to later be compressed. At least some portion of the website data may be encoded, but not all the data is required to be encoded. A storage device stores original website data representing an original webpage. Retrieval logic retrieves the original website data from the storage device. The retrieval may be responsive to a request from an electronic user device. A parser then parses the original website data to detect and tag at least one type of website code within the website data. An encoder will encode the tagged website data and produces encoded website data representing the original website data. The encoded website data may include un-encoded portions of the original website data. A transmitter transmits the encoded website data to the electronic user device. The electronic user device has previously been provided a decoder from the system to decode the encoded website data to recover the original website data. This allows the electronic user device to display the website on the electronic user device.

In another implementation, the system for the encoder is an auto-encoder and includes a neural network to allow the encoder to improve compression of the original website data based on past training on other website data files. The neural network may be modeled on a computer or other suitable system. The neural network further may include at least three hidden layers of simulated neurons.

In another aspect, the system comprises encryption logic for encrypting the encoded website data to produce encrypted website data that is transmitted by the transmitter logic to the electronic user device. The system further comprises signature logic for cryptographically signing the encrypted website data. The signature logic may cryptographically sign the encrypted website data using a private key of a private/public key pair.

According to another aspect, a method of fast data transfer of encoded website data is provided. The method receives an indication that original website data has been requested by a user device. Responsive to the indication, at least a portion of original website data is encoded to produce encoded website data. The encoding uses an auto-encoder. The method provides for sending, responsive to the indication, a decoder for decoding the encoded website data to the user device. Responsive to the indication, the encoded website data is sent to the user device. In an example instance, the decoder is distributed to the user device via web extensions of applications. Upon receipt at a user device, the decoder has the ability to recreate the website at the user device.

According to another aspect, the method further comprises parsing the original website data and tagging original website data for encoding. The encoding a portion of original website data may include encoding tagged original website data and not encoding non-tagged original website data.

The method may include other useful features and configurations. For example the tagged original website data may include at least one of HyperText Markup Language (HTML), Cascading Style Sheets (CS S), JQuery, class definition, or a JavaScript library. In another aspect, the auto-encoder further includes an input row of neurons, at least one hidden row of neurons, and an output row of neurons.

In accordance with another aspect, a method executes, on a processor, instructions that cause the processor to perform operations associated with a function for encoding (i.e., compressing) websites for fast data transfers. The operations comprise receiving a request for an original webpage from an electronic user device. The original webpage is encoded using an auto-encoder based on a neural network. Another operation includes transmitting the encoded website data to the electronic user device. In another aspect, a decoder is transmitted to the electronic user device. The decoder is configured to decode the encoded website data to recover the original website data.

To the accomplishment of the foregoing and related ends, certain illustrative aspects of the claimed subject matter are described herein in connection with the following description and the annexed drawings. These aspects indicate various ways in which the subject matter may be practiced, all of which are intended to be within the scope of the disclosed subject matter. Other advantages and novel features may become apparent from the following detailed description when considered in conjunction with the drawings.

BRIEF DESCRIPTION OF THE DRAWINGS

One or more preferred embodiments that illustrate the best mode(s) are set forth in the drawings and in the following description. The appended claims particularly and distinctly point out and set forth the invention.

The accompanying drawings, which are incorporated in and constitute a part of the specification, illustrate various example methods and other example embodiments of various aspects of the invention. It will be appreciated that the illustrated element boundaries (e.g., boxes, groups of boxes, or other shapes) in the figures represent one example of the boundaries. It is appreciated that in some examples, one element may be designed as multiple elements or that multiple elements may be designed as one element. In some examples, an element shown as an internal component of another element may be implemented as an external component and vice versa. Furthermore, elements may not be drawn to scale.

DETAILED DESCRIPTION

Figure 1:
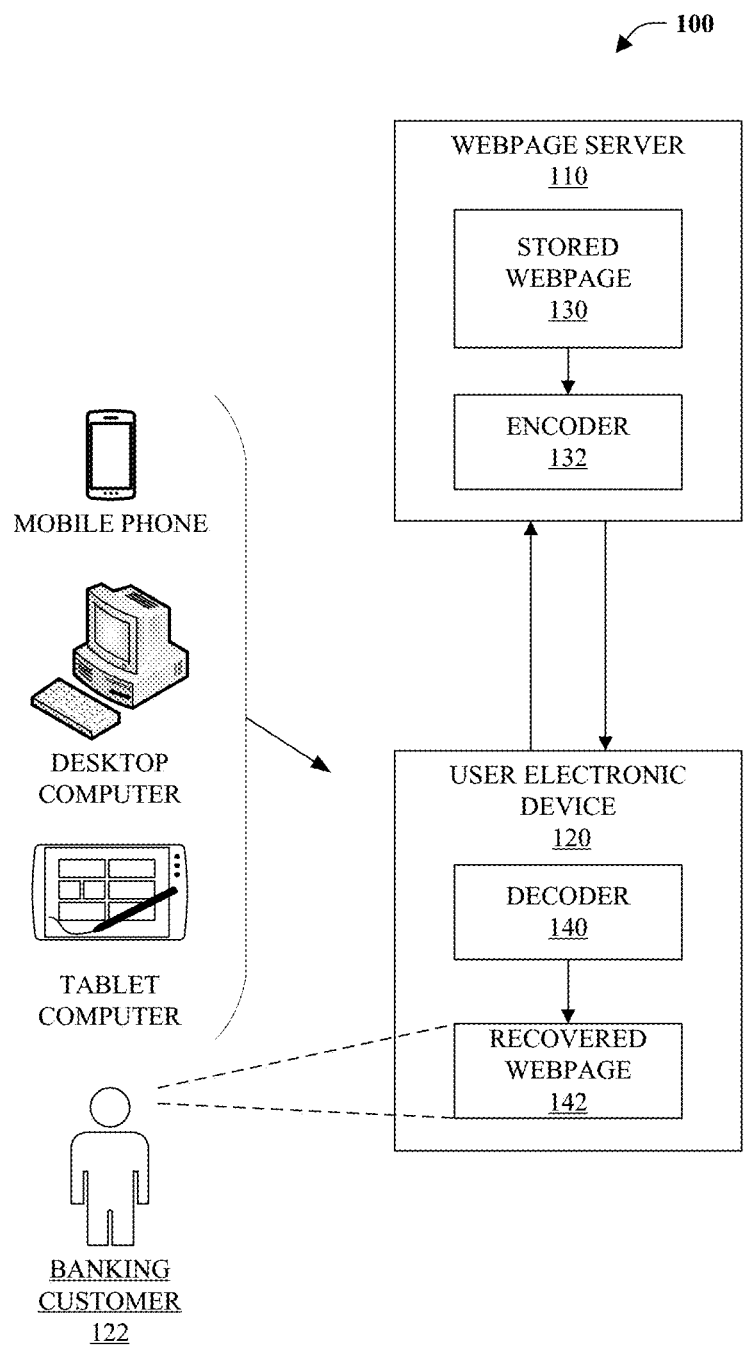
FIG. 1 illustrates an overview of an example implementation.

To more efficiently process banking transactions and perform other actions using webpages, a system uses an encoder to reduce the size of a data file representing a webpage that is to be sent to a remote banking application user. The encoder may be an encoder based on the gzip algorithm or the decoder may be an auto-encoder based on a neural network. In one example implementation, an encoder of the system converts Cascading Style Sheets (CSS) and/or other inline commands combined with the HTML into an encoded data file. Prior to the encoding or with the encoded data, a decoder is distributed via either chrome extensions or other applications to a device used by the remote banking application user. When a link is clicked, by the remote banking application user, the encoded data is sent to the user. The decoder is then utilized to recreate the website on the remote banking application user's electronic user device. Credit card transactions can be processed faster, at least in part, through these encoded and reduced in size webpages with their CSS, HTML or similar inline code/software encoded. Large webpage data files that are encoded can be transmitted much faster.

In more detail, an application that may be a webpage used on an electronic user device such as a mobile phone, computer device, and the like, will request that a remote server send a web browser to the electronic user device. Often several webpages may be requested from the start of a banking transaction to the completion of a banking transaction. The requested webpage is composed of HTML, CSS and other inline code that may be stored or encapsulated in a webpage data file. There may be significant distance from the requesting electronic device that the webpage data file will travel to reach the requesting electronic device and/or the webpage data file may be traveling over a channel with limited bandwidth.

In order to improve the download times for webpages requested by the requesting electronic device, webpage data files needed to display those webpages may be encoded so that they are compressed into smaller files. A smaller file reaches a second device faster no matter how far the smaller file travels and regardless of what bandwidth it travels over as compared to a larger file carrying the same webpage. The original website data can be encoded in many different ways using any acceptable encoding scheme. For example, gzip is a public file algorithm/software application used for file compression and decompression. G2zip is another publicly available file compression tool. Those of ordinary skill in the art will appreciate that other appropriate encoding algorithms may be used.

In one configuration, the entire website data-file representing the entire website may be encoded. However, in other embodiments subsets of data representing the original website data file are encoded. For example, the HyperText Markup Language (HTML) and/or Cascading Style Sheets (CSS) portions of the website data file may be encoded. Alternatively, and/or in addition, the JQuery JavaScript library may be encoded without encoding the rest of the file. Other sub-portions of the website data file may be encoded.

If a lossless encoding algorithm or scheme is used to encode website data, then in some embodiments a hash and/or signature of the original website data may be determined before the original website data is encoded. After the encrypted website data has been decrypted to recover the original website data, this original website data is again hashed and/or a second signature is determined. The second hash and/or second signature can be compared to the original hash and/or signature to determine that the original website data has been received without any loss or alteration of data.

Details disclosed herein generally pertain to a way of encoding data that involves extracting and encoding certain portions of website data for encoding in order to speed up the transmission of the website data to a remote electronic user device. A system can be employed that has a storage device. The storage device is used to store original website data representing an original webpage. When a request for the original webpage is received from the remote electronic user device, the original website data is retrieved from the storage device. After the original website data is retrieved, a parser can parse the original website data to detect at least one type of website code within the website data to be encoded by an encoder. For example, CSS code or other types of code may be tagged by the parser for encoding. After CSS code is tagged by the parser, the encoder may then encode the tagged code to create an encoded website data representing a compression of the original website data. A transmitter will then transmit the encoded website data to the remote electronic user device. The electronic user device has been previously provided a decoder that can decode the encoded website data to recover the original website data and to allow the electronic user device to display the website.

Various aspects of the subject disclosure are now described in more detail with reference to the annexed drawings, wherein like numerals generally refer to like or corresponding elements throughout. It should be understood, however, that the drawings and detailed description relating thereto are not intended to limit the claimed subject matter to the particular form disclosed. Instead, the intention is to cover all modifications, equivalents, and alternatives falling within the spirit and scope of the claimed subject matter.

"Processor" and "Logic", as used herein, includes but is not limited to hardware, firmware, software, and/or combinations of each to perform a function(s) or an action(s), and/or to cause a function or action from another logic, method, and/or system. For example, based on a desired application or need, logic and/or processor may include a software-controlled microprocessor, discrete logic, an application specific integrated circuit (ASIC), a programmed logic device, a memory device containing instructions, or the like. Logic and/or processor may include one or more physical gates, combinations of gates, or other circuit components. Logic and/or a processor may also be fully embodied as software. Where multiple logics and/or processors are described, it may be possible to incorporate the multiple logics and/or processors into one physical logic (or processor). Similarly, where a single logic and/or processor is described, it may be possible to distribute that single logic and/or processor between multiple physical logics and/or processors.

Referring initially to FIG. 1, a high-level overview of an example implementation of a system 100 for compressing websites for fast data transfers is illustrated. This example implementation includes a webpage server 110 and a remote electronic user device 120. The website server 110 and the remote electronic user device 120 may be a significant distance from one another. As shown, the electronic user device 120 may be any one of a mobile phone, a desktop computer, a tablet computer, or another type of electronic device or a device capable of displaying a webpage. Request for a webpage may originate from a variety of electronic user devices 120 operated by a banking customer. In one instance, the request for website data can correspond to credit card transactions coming from one or more third party merchants associated with a customer purchase that may be initiated at a computer. In another instance, request for website data may come from a banking customer 122 using a mobile telephone while that user is conducting a banking transaction on their phone. In yet another example, a student may conduct a banking transaction with an application on their tablet computer that requests another banking website. In operation, the electronic user device 120 requests a webpage from the webpage server 110. Before transmitting the requested webpage to the electronic user device 120, the webpage server 110 encodes/compresses the webpage for faster transfer. Various ways of encoding the webpage are discussed below.

The webpage server 110 includes a stored webpage 130 and an encoder 132. The stored webpage 130 may be stored in the webpage server 110 with other webpages and other data. The webpage server 110 may be located far away from the electronic user device 120. The webpage server 110 and the electronic user device 120 may be networked together using any suitable network that may include a wired network and/or a wireless network. The stored webpage 130 can be stored in any suitable memory such as an optical disk memory, a non-optical disk memory, a solid state memory such as RAM memory or ROM memory, or another suitable memory.

The encoder 132 operates to compress the webpage into a file that is smaller than an original file representing the webpage 130. For example, the encoder 132 may include the gzip software and algorithm and may use the gzip software and algorithm when encoding data representing the webpage 130. In other situations bzip2, 7-zip, PeaZip, or other suitable encoding software/algorithms can be used to compress data representing the webpage 130 before the encoded webpage is transmitted to the electronic user device 120. In other scenarios, the encoder 132 encodes the only portions of the webpage 130 rather than the entire webpage. For example, only the Cascading Style Sheets (CSS), jQuery, classes, and/or other sub-portions of the HTML may be encoded without encoding the entire webpage.

In operation, the electronic user device 120 will request data representing the webpage 130 from the webpage server 110. This may be in response to a request from banking application that a customer is using to perform a banking transaction. In response to that request, the webpage server 110 retrieves webpage data representing the stored webpage 130 and provides this data to the encoder 132. In some implementations, the webpage server 110 may also push a decoder 140 down to the electronic user device 120. The encoder 132 encodes the data representing the webpage 130 by encoding at least some of the CSS, jQuery, classes, and/or other sub-portions of the HTML.

The encoded data is then transmitted from the webpage server 110 to the electronic user device 120. The electronic user device 120, using the decoder 140, decodes the encoded data using an inverse algorithm as to what was used by the encoder 132 to encode the data representing the webpage 130. The decoded data can then be used to produce the recovered webpage 142 that is identical to the original webpage 130 stored by the webpage server 110. The recovered webpage 142 can be displayed on the electronic user device 120 and the banking customer 122 can continue their banking transaction using the recovered webpage 142.

Figure 2:
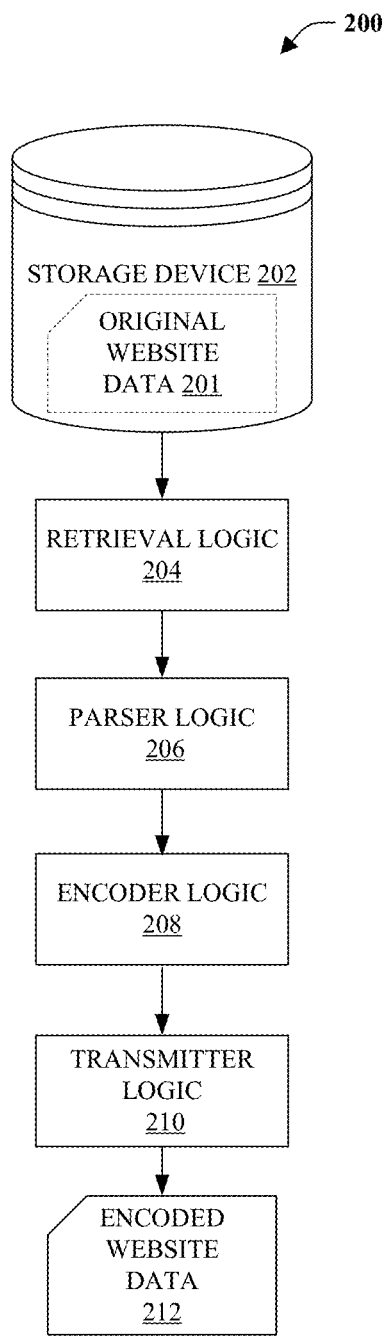
FIG. 2 is a block diagram of an encoding system.

Turning attention to FIG. 2, an example system 200 for compressing websites for fast data transfers is illustrated in further detail. The system 200 includes a storage device 202, a retrieval logic 204, a parser logic 206, an encoder logic 208, and a transmitter logic 210. The system for encoding of website data 200 is operable to encode website data and to provide the encoded data to a user device for later decoding. At least the retrieval logic 204, parser logic 206, and encoder logic 206 can be implemented by a processor coupled to a memory that stores instructions that, when executed, cause the processor to perform the functionality of each logic. As such, a computing device is configured to be a special-purpose device that implements the functionality of the system for encoding webpage data 200.

The storage device 202 can be any suitable device capable of storing and permitting the retrieval of data. In one aspect, the storage device 202 is capable of storing data representing an original website or multiple related websites. Storage media includes volatile and non-volatile, removable and non-removable media implemented in any method or technology for storage of information. Storage media includes, but is not limited to, storage devices such as memory devices (e.g., random access memory (RAM), read-only memory (ROM), magnetic storage devices (e.g., hard disk, floppy disk, cassettes, tape . . . ), optical disks and other suitable storage devices.

In some instances, the retrieval logic 204 is implemented to respond to a request from an external user device for original webpage data that represents a webpage. As mentioned above, the user device may be an electronic device such as a mobile phone, a desktop computer, a tablet computer, and the like. Upon receiving a request from a user device, the retrieval logic 204 will make a request to the storage device 202 for the desired original webpage data 201. The data representing the webpage is provided to the retrieval logic 204, which then presents this original website data 201 to the parser logic 206. In another embodiment, this data may be provided directly to the parser logic 206 from the storage device 202.

The parser logic 206 is configured to parse the original website data 201 to look for portions of the website data that may be encoded. As previously mentioned, the parser may look for CSS code, C++ classes, HTML HyperText Markup Language (HTML), jQuery, class definition, a JavaScript library, or another type of code. This can be performed by the parser scanning the original website data 201 from beginning to end while looking for the certain code types. When a code type is found that should be encoded, that code type could be tagged. Said another way, the parser logic 206 is configured to parse the original website data 201 to detect and tag at least one type of website code within the website data. The detected and tagged at least one type of website code is tagged website data.

Alternatively, the code type could be removed by the parser logic 206 and marked with an identifier placeholder. In these cases, these code types will not be encoded but will be replaced with identifier placeholders and later, when the original webpage is being re-assembled near the user device that requested the webpage, those identified code types will be replaced with a local or more local copy of the code that is cached in or near the electronic user device. For example, a content delivery network (CDN) local to the user device could replace identifier placeholders with the original website code. Alternatively, a local server may act as an "edge server" somewhat near the electronic user device 120 to provide often accessed webpages to the electronic user device 120 more rapidly.

In general, original website data 201 that is tagged by the parser is encoded by the encoder logic 208. The encoder logic 208 is configured to encode the tagged website data and to produce encoded website data 212 representing the original website data. The encoder logic 208 may use any suitable compression software/algorithm when compressing desired code of the original website data 201. For example, gzip, bzip2, 7-zip, PeaZip, or other suitable encoding software/algorithms may be used to encode and compress the data. Only code tagged by the parser logic 206 may actually be encoded by the encoder logic 208, not the entire original website data file. However, in some implementations it may be desirable to encode the entire original website data file.

When the encoding of the original website data 201 is completed or when enough data has been encoded, the transmitter logic 210 may begin transmitting the encoded website data 212 to the electronic user device. The transmitter logic 210 may transmit the data wirelessly or through a wire. In some instances, the electronic user device has been provided a decoder logic configured to decode the encoded website data 212 to recover the original website data and to allow the electronic user device to display the website. When transmitting wirelessly, the transmitter logic 210 may include modulation logic for modulating the encoded website data 212 unto a carrier signal and may include an antenna to transmit this signal toward the user device. In other instances, the transmitter logic 210 may transmit the encoded website data 212 into a network for wired and/or wireless transmission.

Figure 3:
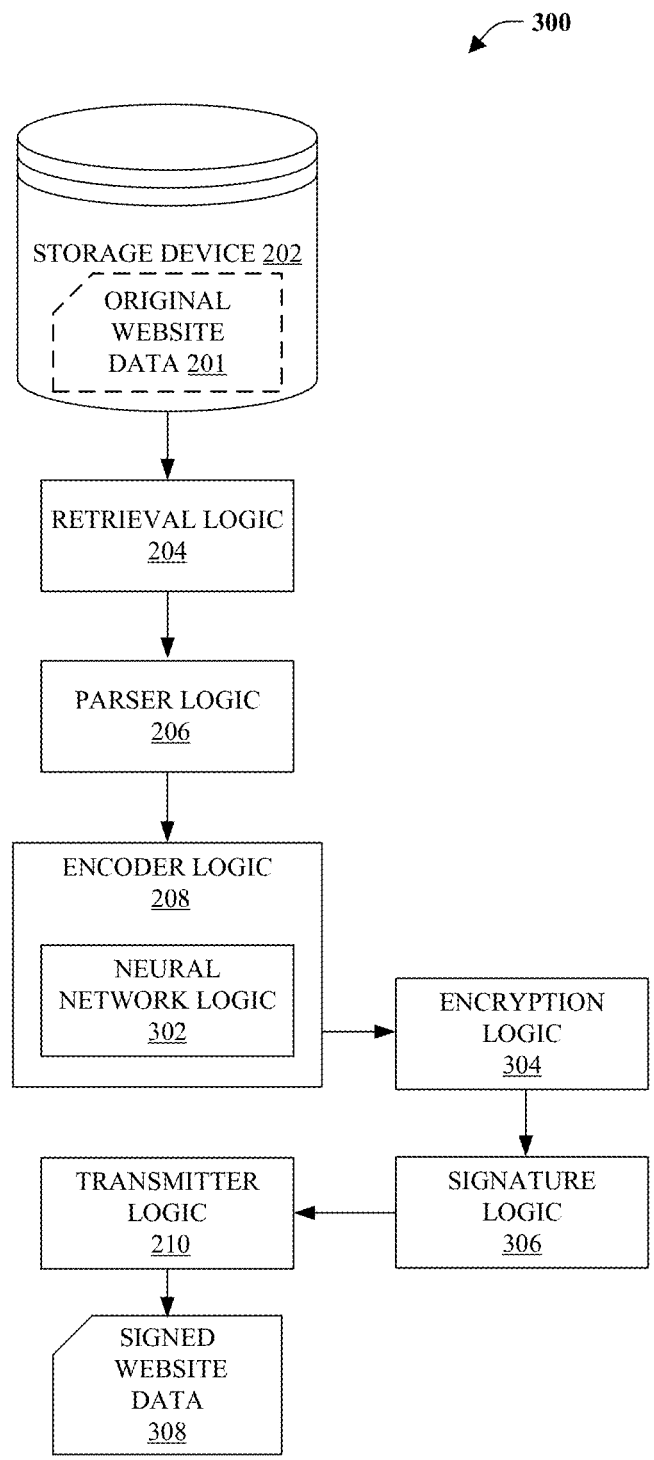
FIG. 3 is a block diagram of another example encoder system.

FIG. 3 illustrates another example system 300 for compressing websites for fast data transfers. The system 300 encodes website data 300 and later provides for a decoder for decoding of the website data. Similar to FIG. 2, the system 300 includes a storage device 202, a retrieval logic 204, a parser logic 206, an encoder logic 208, and a transmitter logic 210 of FIG. 2. In accordance with another aspect, the system 300 includes neural network logic 302, encryption logic 304, and signature logic 306. The system 300 for compressing (encoding) website data for fast data transfers is also configured to produce encoded data that is encrypted and then signed to produce signed website data. The neural network logic 302, encryption logic 304, and signature logic 306 can be computer-executable components specified in terms of instructions that cause a processor to perform the functionality of each component.

The storage device 202 can be any suitable device capable of storing and permitting the retrieval of data. In one aspect, the storage device 202 is capable of storing data representing a website or multiple related websites. Storage media includes volatile and non-volatile, removable and non-removable media implemented in any method or technology for storage of information. Storage media includes, but is not limited to, storage devices such as memory devices (e.g., random access memory (RAM), read-only memory (ROM), magnetic storage devices (e.g., hard disk, floppy disk, cassettes, tape . . . ), optical disks and other suitable storage devices.

In at least one aspect, the retrieval logic 204 responds to a request from an external user device requesting original webpage data that represents a webpage be provided to the user device for a bank transaction. The retrieval logic 204 next makes a request to the storage device 202 for the desired original webpage data 201 that represents the desired webpage. The data representing the webpage is provided to the retrieval logic 204, which then presents this original website data 201 to the parser logic 206.

The parser logic 206 parses the original website data 201 to look for portions of the website data that may be encoded. As previously mentioned, the parser may look for CSS code, C++ classes, HTML or certain types of HTML code, or another type of code. This can be performed by the parser logic 206 scanning the original website data 201 from beginning to end while looking for the certain code types. When a code type is found that should be encoded, that code type could be tagged. Alternatively, the code type could be removed by the parser logic 206 and marked with an identifier placeholder. As previously mentioned, these code types will not be encoded but will be replaced with identifier placeholders and later, when the original webpage is being re-assembled near or at the user device that requested the webpage, those identified code types will be replaced with a local or more local copy of the code that is cached in or near the electronic device.

In general, original website data 201 that is tagged by the parser logic 206 is encoded by the encoder logic 208. The encoder logic 208 may use any suitable compression software/algorithm when compressing desired code of the original website data 201. Only code tagged by the parser logic 206 may actually be encoded by the encoder logic 208, not the entire original website data file. However, in some implementations it may be desirable to encode the entire original website data file.

Figure 4:
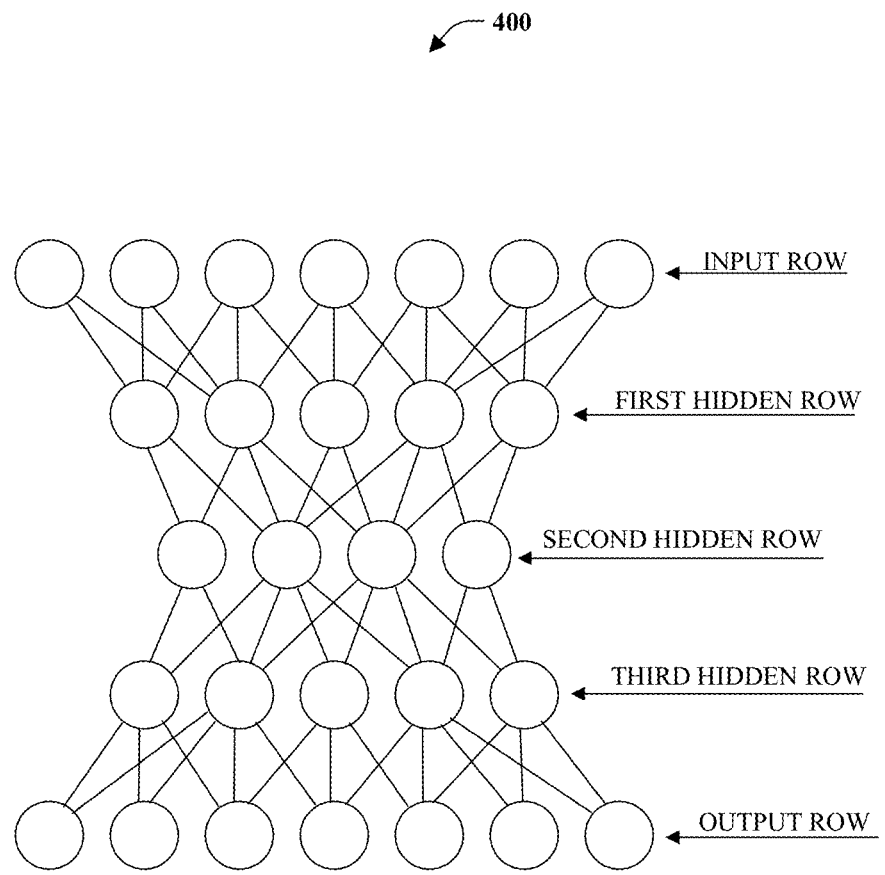
FIG. 4 is a block diagram of an example neural network.

The encoder logic 208 (i.e., auto-encoder) may include a neural network logic 302 to model a neural network to allow the encoder to improve compression of the original website data based on past training on other training website data files. FIG. 4 illustrates and example neural network 400. The neural network logic 302 may be simulated by software running on a processor or may be implemented with discrete logical components or a combination of both. Neural networks, also known as artificial neural networks (ANNs) or simulated neural networks (SNNs), are a subset of machine learning and are at the heart of deep learning algorithms. Neural network's name and structure are inspired by the human brain, mimicking the way that biological neurons signal to one another.

Artificial neural networks (ANNs) are comprised of a node rows, containing an input row, one or more hidden rows, and an output row. FIG. 4 illustrates one example of a neural network 400. This network 400 has an input row of neurons, a first hidden row of neurons, a second hidden row of neurons, a third row of neurons, and one output row of neurons. The circles in FIG. 4 represent neurons and the lines connecting neurons represent synapses or connections between neurons. Each node, or artificial neuron, connects to another and has an associated weight and threshold. In one example instance, the output of any individual node is above the specified threshold value, that node is activated, sending data to the next row of the network. Otherwise, a zero data value is passed along to the next row of the network for that particular neuron.

The encoder logic 208 sequentially provides parsed data to the input row of neurons to be encoded by the neural network 400 until all desired data is encoded. Encoded data is presented by the output row of neurons and collected by encoder logic 208 for presentation to the encryption logic 304. Of course, the neural network 400 will need to be initially trained on how to encode various types of data. Differing numbers of neurons per row and different amounts of rows of neurons may be used than what is illustrated in example FIG. 4. In one implementation the neural network has at least three hidden layers of simulated neurons.

The encryption logic 304 is operable to produce encrypted website data by way of an encryption algorithm or function. The encryption logic 304 can receive, retrieve, or otherwise obtain the encoded data from the encoder logic 208. An encryption algorithm is subsequently executed on the combination to produce an encrypted value representative of the encoded website data. Stated differently, the original plaintext of the combination of encoded website data is encoded into an alternate cipher text form. For example, the Advanced Encryption Standards (AES), Data Encryption Standard (DES), or another suitable encryption standard or algorithm may be used. In one instance, symmetric-key encryption can be employed in which a single key both encrypts and decrypts data. The key can be saved locally or otherwise made accessible by the encryption logic 304. Of course, an asymmetric-key encryption can also be employed in which different keys are used to encrypt and decrypt data. For example, a public key for a destination downstream function can be utilized to encrypt the data. In this way, the data can be decrypted downstream, at a user device as mentioned earlier, utilizing a corresponding private key of a function to decrypt the data. Alternatively, a downstream function could use its public key to encrypt known data.

The example system 300 may provide an additional level of security to the encoded data by digitally signing the encrypted website data and produce signed website data 308. Digital signatures employ asymmetric cryptography. In many instances, digital signature provide a layer of validation and security to messages (i.e., website data) sent through a non-secure channel. Properly implemented, a digital signature gives the receiver, user device, reason to believe the message was sent by the claimed sender.

Digital signature schemes, in the sense used here, are cryptographically based, and must be implemented properly to be effective. Digital signatures can also provide non-repudiation, meaning that the signer cannot successfully claim they did not sign a message, while also claiming their private key remains secret. In one aspect, some non-repudiation schemes offer a timestamp for the digital signature, so that even if the private key is exposed, the signature is valid.

Digitally signed messages may be anything representable as a bit-string such as encrypted website data. The encryption logic 304 may user signature algorithms such as RSA (Rivest-Shamir-Adleman) which is a public-key cryptosystem that is widely used for secure data transmission. Alternatively, the Digital Signature Algorithm (DSA), a Federal Information Processing Standard for digital signatures, based on the mathematical concept of modular exponentiation and the discrete logarithm problem may be used. Other instances of the signature logic 306 may use other suitable signature algorithms and functions. When the encoding and encryption of the original website data 201 is completed or when enough data has been encode and encrypted, the transmitter logic 210 may begin transmitting the encoded website data 212 to the user device.

Figure 5:
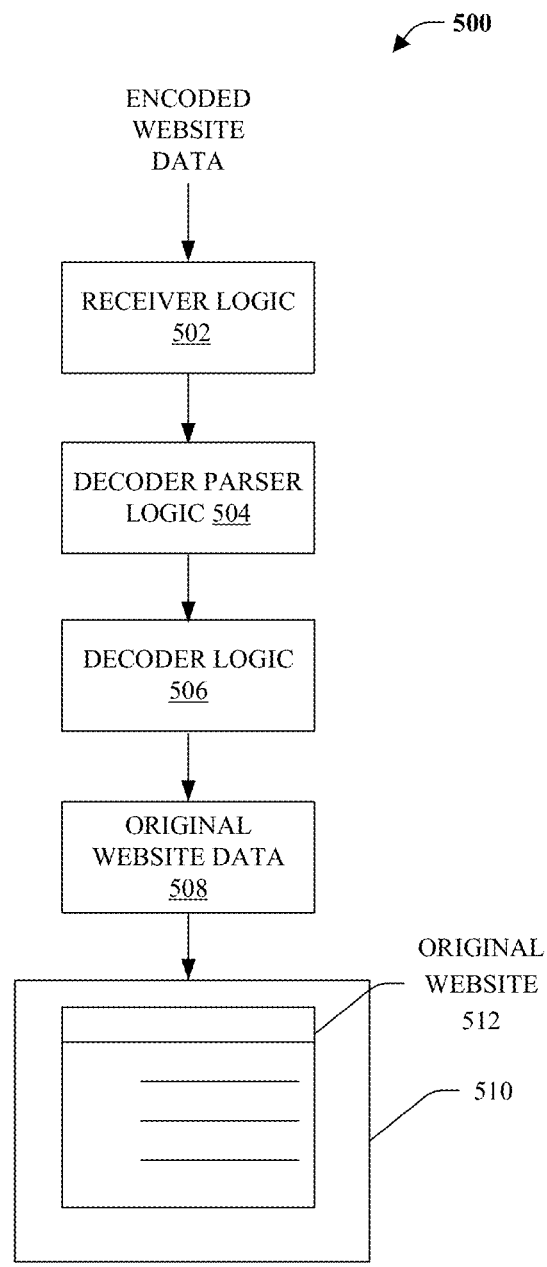
FIG. 5 is a block diagram of a decoding system.

FIG. 5, illustrates an example receiver system 500 that is a receiver portion of a user device. The receiver system 500 displays on a display 510 of the user device an original website 512 after its encoded data has been decoded. The system 500 includes a receiver logic 502, a decoder parser logic 504, decoder logic 506, original website data 508, and a display of the original website 510. The system for encoding of a website's data 200, discussed above with reference to FIG. 2, is operable to encode website data and to provide the encoded data to a user device for later decoding. A least portions of the receiver logic 502, decoder parser logic 504, and decoder logic 506 can be implemented by a processor coupled to a memory that stores instructions that, when executed, cause the processor to perform the functionality of each logic. As such, a computing device is configured to be a special-purpose device that implements the functionality of the receiver system 500 for decoding webpage data.

The receiver logic 502 may include logic and other circuits for receiving encoded website data from a wired network. In another aspect, the receiver logic 502 may include an antenna for receiving wireless encoded website data. In some embodiments, after the encoded website data is received, the carrier signal containing the encoded website data may be converted to a lower frequency and then demodulated to recover the encoded website data. The demodulated encoded website data is provided to the decoder parser logic 504.

In some instances, the decoder parser logic 504 parses (i.e., scans) the demodulated encoded website data to find encoded data and/or identifier placeholders for certain data that has been removed for the encoded website data. Encoded website data may have metadata (or a header) indicating the following data is encoded. As mentioned above, CSS code, C++ classes, HTML or certain types of HTML code, or another type of code may have been encoded. For example, the encoded/compressed website data may have been encoded using a suitable encoding algorithm such as gzip, bzip2, 7-zip, PeaZip, or the like. Alternatively, the decoder parser logic 504 may discover identifier placeholders. Identifier placeholders indicating website data has been removed and replaced with the identifier placeholder. In that case, the decoder logic 506, discussed below, will find a local copy of what is represented by the identifier placeholder and replace the identifier placeholder with what is represented by the identifier placeholder.

In general, original website data that is tagged by the decoder parser logic 504 is decoded by the decoder logic 506. The decoder logic 506 may use any suitable decompression software/algorithm when decompressing encoded code of the original website data. In some aspects, the decoder logic 506 generally performs an inverse function of what was performed on the on the encoded website data to recover the original website data 508. In some situations, the decoder logic 506 may decode encoded data using suitable inverses of the encoding algorithms/programs of gzip, bzip2, 7-zip, PeaZip, or the like. In some instances, only code tagged by the parser logic 206 may actually be decoded by the decoder logic 506, not the entire original website data file. However, in some implementations it may be desirable to decode an entire encoded website data file when the entire encoded website data file has been encoded.

After the encoded website data has been decoded by the decoder logic 506, the original website 512 may be displayed by the electronic user device or another type of user device. For example, a mobile phone may display the original website data 508 on a display of the mobile phone so that a user may see the original website 512. In another instance, the original website 512 may be displayed on a display of a desktop computer, a tablet computer, or on a display of another device.

The aforementioned systems, architectures, platforms, environments, or the like have been described with respect to interaction between several logics and components. It should be appreciated that such systems and components can include those logics and/or components or sub-components and/or sub-logics specified therein, some of the specified components or logics or sub-components or sub-logics, and/or additional components or logics. Sub-components could also be implemented as components or logics communicatively coupled to other components or logics rather than included within parent components. Further yet, one or more components or logics and/or sub-components or sub-logics may be combined into a single component or logic to provide aggregate functionality. Communication between systems, components or logics and/or sub-components or sub-logics can be accomplished following either a push and/or pull control model. The components or logics may also interact with one or more other components not specifically described herein for the sake of brevity but known by those of skill in the art.

In view of the example systems described above, methods that may be implemented in accordance with the disclosed subject matter will be better appreciated with reference to flow chart diagrams of FIGS. 6-9. While for purposes of simplicity of explanation, the methods are shown and described as a series of blocks, it is to be understood and appreciated that the disclosed subject matter is not limited by order of the blocks, as some blocks may occur in different orders and/or concurrently with other blocks from what is depicted and described herein. Moreover, not all illustrated blocks may be required to implement the methods described hereinafter. Further, each block or combination of blocks can be implemented by computer program instructions that can be provided to a processor to produce a machine, such that the instructions executing on the processor create a means for implementing functions specified by a flow chart block.

Figure 6:
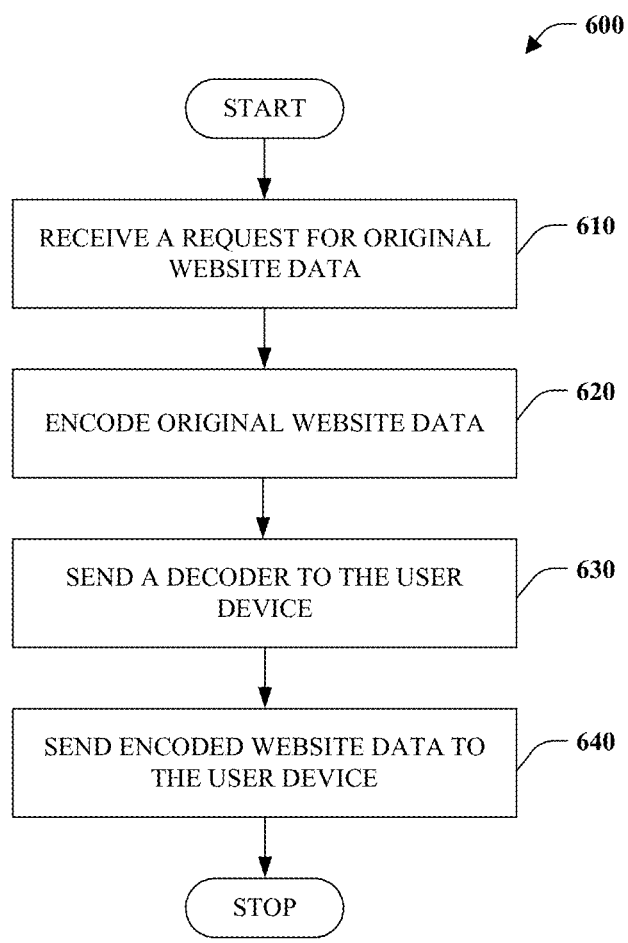
FIG. 6 is a flow chart diagram of an encoding method.

Turning attention to FIG. 6, a method 600 for compressing websites for fast data transfers is depicted in accordance with an aspect of this disclosure. The method 600 for compressing websites for fast data transfers can be performed by the system 100 for encoding original website data, as discussed above with reference to FIG. 1.

At reference numeral 610, an indication is received that the original website data has been requested by a user device. A user may be conducting a banking transaction and the website data may correspond to the banking transaction. The indication may be received at a website server. The indication may be received from a mobile phone, a desktop computer, a tablet computer, or another user device.

At reference numeral 620, responsive to the indication, a portion of original website data is encoded, to produce encoded website data. In some instances, the encoding is performed with an auto-encoder. In other instances, the auto-encoder further includes an input row of neurons, at least one hidden row of neurons, and an output row of neurons. In other embodiments, portions of the original website data may be encoded using suitable encoding algorithms/programs such as gzip, bzip2, 7-zip, PeaZip, or the like. In other embodiments, a combination of an auto-encoder and encoding algorithms/programs of gzip, bzip2, 7-zip, PeaZip, or the like algorithms may be used to encode the original website data.

At numeral 630, responsive to the indication, a decoder is sent to the user device, for decoding the encoded website data. In some aspects, the decoder is distributed to the user device from the server performing the encoding in numeral 620. In other instances, the decoder is sent to the user device as soon as the indication is received that the original website data has been requested by a user device.

At numeral 640, responsive to the indication, the encoded website data is sent to the user device. Upon receipt of the encoded website data at the user device, the decoder has the ability to recreate the website for the user device. For example, the encoded website data may be decoded and the associated website so that a banking transaction can be displayed on a display of the user device.

Figure 7:
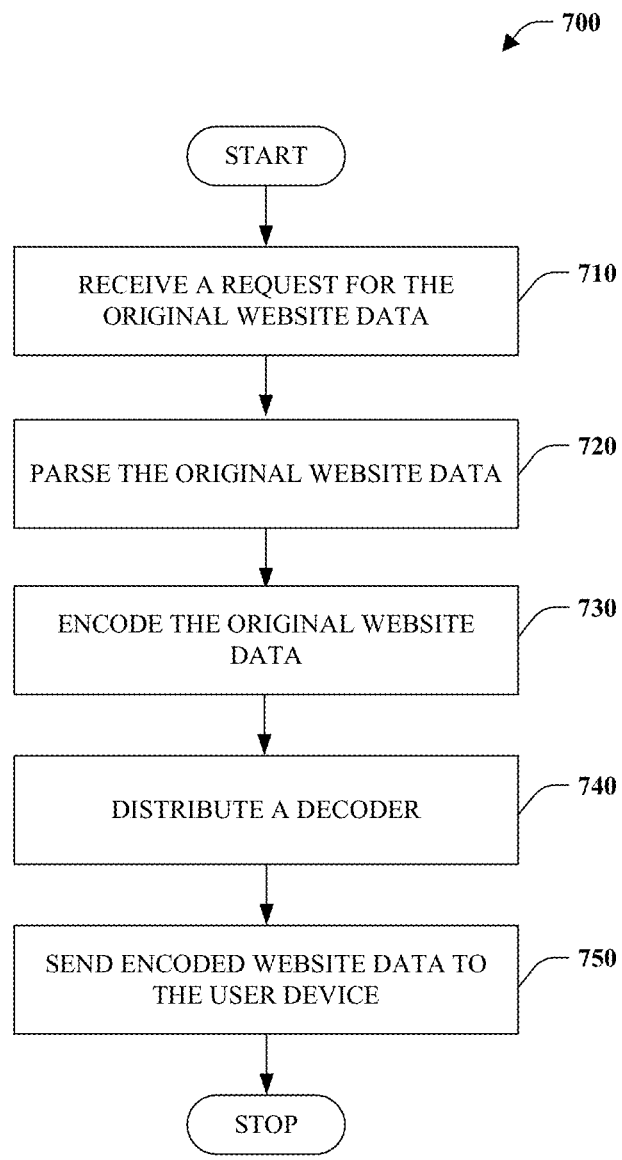
FIG. 7 is a flow chart diagram of another encoding method.

FIG. 7 depicts a method 700 for compressing websites for fast data transfers. The method 700 can be implemented and performed by the system 100 for compressing websites for fast data transfers.

At numeral 710, the method 700 receives a request for original website data. A user may be processing a banking request that needs to view the website associated with the original website data. The request may originate from a remote user device. The user device may be a mobile phone, desktop computer, a tablet computer, or another device.

At reference numeral 720, the original website data is parsed and at least some of the data is tagged to be encoded. The parsed website data includes at least one of: HyperText Markup Language (HTML), Cascading Style Sheets (CSS), JQuery, class definition, a JavaScript library, or another type of website code.

At numeral 730, the original website data is encoded, responsive to the indication and the parsing. The encoding a portion of original website data includes encoding the tagged original website data and not encoding non-tagged original website data. At least a portion of original website data is encoded using algorithms/programs of gzip, bzip2, 7-zip, PeaZip, or the like algorithm. Tagged original website data may alternatively be encoded using an auto-encoder. In some instances, the auto-encoder further includes an input row of neurons, at least one hidden row of neurons, and an output row of neurons.

At numeral 740, a decoder is sent to the user device, for decoding the encoded website data. In some aspects, the decoder is distributed to the user device via web extensions of applications. The decoder may be sent before the encoding begins, while the encoding is being processed, or when the encoding is complete.

At reference numeral 750, the encoded website data is sent to the user device. The encoded website data may be sent in a single file. Alternatively, the encoded website data may be streamed to the user device as it becomes available from the encoding.

Figure 8:
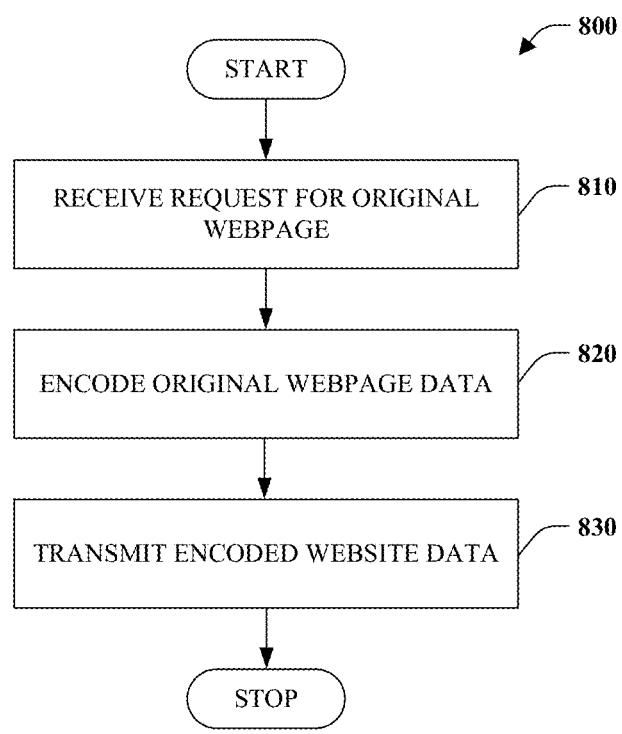
FIG. 8 is a flow chart diagram of another encoding method.

Turning to FIG. 8, a method 800 for compressing websites for fast data transfers is depicted in accordance with an aspect of this disclosure. The method 800 can be performed by the system 300 for compressing websites for fast data transfers and, more specifically, the encryption component 302.

FIG. 8 illustrates an example method 800 of encoding original website data and transmitting that data. The method 800 executes, on a processor, instructions that cause the processor to perform operations associated with functions for encoding original website data.

At reference number 810, a request for an original webpage is received. The request may be received from an electronic user device. The request may be for a webpage associated with performing a banking function on the electronic user device. The electronic user device may be a remote electronic user device that is a mobile phone, a tablet computer, a desktop computer or another user device.

At reference 820, the original webpage data associated with the webpage is encoded. The original webpage data may be encoded using gzip, bzip2, 7-zip, PeaZip, or the like algorithm. In another implementation, the webpage may be at least partially encoded using an auto-encoder based on a neural network. The auto-encoder may include at least one input row of neurons, at least one middle row of neurons, and at least one output row of neurons.

In other instances, the encoded website data may be encrypted by way of an encryption algorithm or function. The encryption algorithm produces an encrypted value representative of the encoded website data. For example, the Advanced Encryption Standards (AES), Data Encryption Standard (DES), or another suitable encryption standard or algorithm may be used. In one instance, symmetric-key encryption can be employed in which a single key both encrypts and decrypts data. The key can be saved locally or otherwise made accessible by the encryption logic 304. Of course, an asymmetric-key encryption can also be employed in which different keys are used to encrypt and decrypt data. For example, a public key for a destination downstream function can be utilized to encrypt the data.

The example system 800 may provide an additional level of security to the encoded data by digitally signing the encrypted website data and produce signed website data. Digital signatures employ asymmetric cryptography. In many instances, digital signature provide a layer of validation and security to messages (i.e., website data) sent through a non-secure channel.

At reference number 830, the method 800 transmits the encoded website data to the electronic user device. Additionally, a decoder is also transmitted to the electronic user device. The decoder is configured to decode the encoded website data to recover the original website data. In some aspects, the decoder can be distributed to the user device via web extensions of applications.

Figure 9:
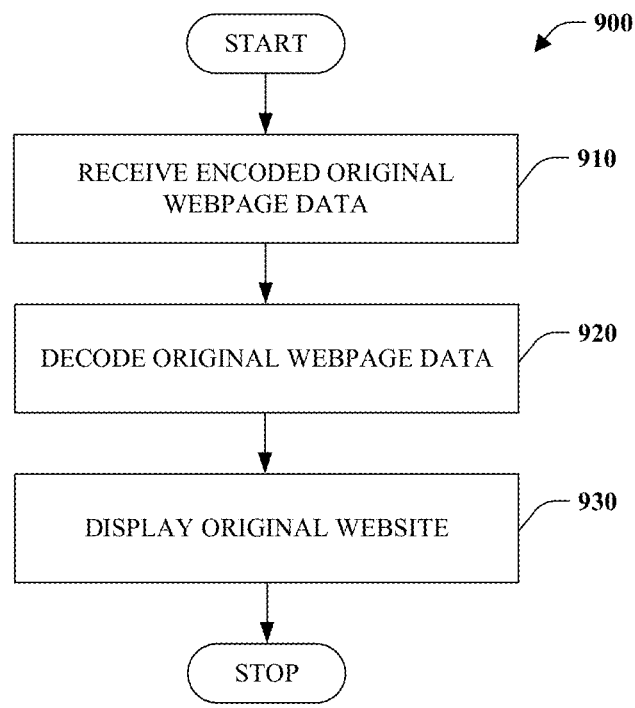
FIG. 9 is a flow chart diagram of a decoding method.

FIG. 9 depicts an example receive end of a method 900 of compressing websites for fast data transfers. The method 900 can be implemented and performed by the receiver system 500, including the receiver logic 502 and the decoder logic 504.

At reference numeral 910, encoded original website data is received by a user device. The original website data may be associated with a website that the user device needs to use to perform a banking transaction. The user device may be an electronic user device such as a mobile phone, a tablet computer, a desktop computer, or the like. The encoded (e.g., compressed) original website data may be received through a network cable or wirelessly. The encoded original website data may be received in a single data file or received in other ways.

At reference 920, the encode webpage data is decoded. Of course, if a parser was used to tag certain portions of the webpage data, as discussed above, then just those portions will need decoded. The decoding may involve running an inverse decoding algorithm than what was used to encode the encoded webpage data or may involve running an "inverse" auto-encoder (i.e., "auto-decoder") that is set up to decode the encoded website data. Decoding algorithms may be the "inverse" algorithms of gzip, bzip2, 7-zip, PeaZip, or the like.

At reference 930, the original website is displayed. The website may be displayed on a display of the user device. The website may be used by the user to proceed with their banking transaction.

The subject disclosure pertains to the technical problem of encoding website data in a way for enhanced compression to improve the transmission of the encoded website data to a remote user device. The technical solution includes a storage device for storing original website data representing an original webpage. A parser logic parses the original website data to detect at least one type of website code within the website data to be encoded by the encoder logic. The parser logic tags the at least one type of website code within the original website data with a tag. Encoder logic encodes the tagged webpage data. Transmitter logic transmits the encoded website data to the electronic user device. The electronic user device has been provided a decoder logic configured to decode the encoded website data to recover the original website data and to allow the electronic user device to display the website.

As used herein, the terms "component" and "system," as well as various forms thereof (e.g., components, systems, sub-systems . . . ) are intended to refer to a computer-related entity, either hardware, a combination of hardware and software, software, or software in execution. For example, a component may be but is not limited to being a process running on a processor, a processor, an object, an instance, an executable, a thread of execution, a program, and/or a computer. By way of illustration, both an application running on a computer and the computer can be a component. One or more components may reside within a process and/or thread of execution, and a component may be localized on one computer and/or distributed between two or more computers.

The conjunction "or" as used in this description and appended claims is intended to mean an inclusive "or" rather than an exclusive "or," unless otherwise specified or clear from the context. In other words, "'X' or 'Y'" is intended to mean any inclusive permutations of "X" and "Y." For example, if "'A' employs 'X,'" "'A employs 'Y,'" or "'A' employs both 'X' and 'Y,'" then "'A' employs 'X' or 'Y'" is satisfied under any of the preceding instances.

Furthermore, to the extent that the terms "includes," "contains," "has," "having" or variations in form thereof are used in either the detailed description or the claims, such terms are intended to be inclusive in a manner similar to the term "comprising" as "comprising" is interpreted when employed as a transitional word in a claim.

Figure 10:
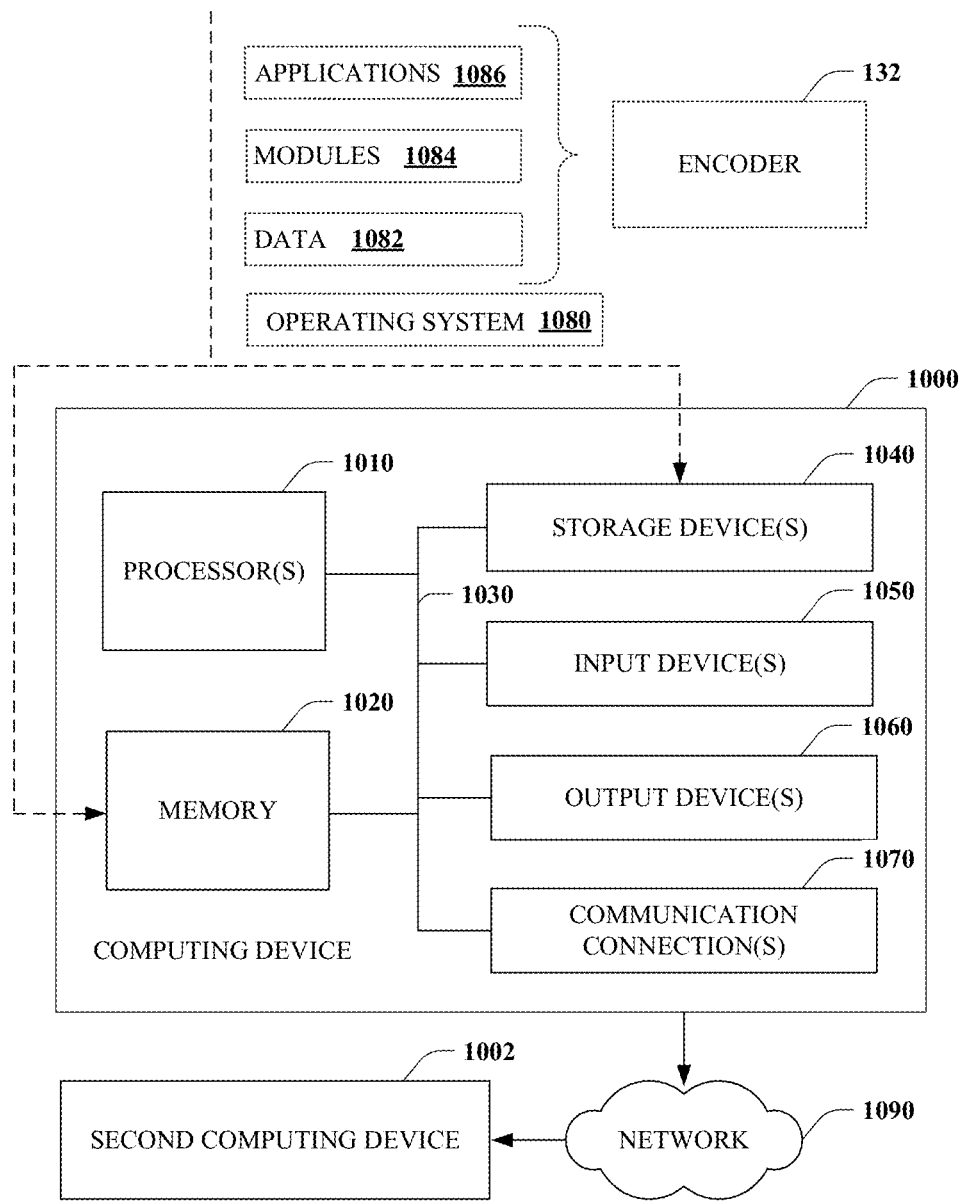
FIG. 10 is a block diagram illustrating a suitable operating environment for aspects of the subject disclosure.

To provide a context for the disclosed subject matter, FIG. 10, as well as the following discussion, are intended to provide a brief, general description of a suitable environment in which various aspects of the disclosed subject matter can be implemented. However, the suitable environment is solely an example and is not intended to suggest any limitation on scope of use or functionality.

While the above-disclosed system and methods can be described in the general context of computer-executable instructions of a program that runs on one or more computers, those skilled in the art will recognize that aspects can also be implemented in combination with other program modules or the like. Generally, program modules include routines, programs, components, data structures, among other things, that perform particular tasks and/or implement particular abstract data types. Moreover, those skilled in the art will appreciate that the above systems and methods can be practiced with various computer system configurations, including single-processor, multi-processor or multi-core processor computer systems, mini-computing devices, server computers, as well as personal computers, hand-held computing devices (e.g., personal digital assistant (PDA), smartphone, tablet, watch . . . ), microprocessor-based or programmable consumer or industrial electronics, and the like. Aspects can also be practiced in distributed computing environments where tasks are performed by remote processing devices linked through a communications network. However, some, if not all aspects, of the disclosed subject matter can be practiced on stand-alone computers. In a distributed computing environment, program modules may be located in one or both of local and remote memory devices.

With reference to FIG. 10, illustrated is an example computing device 1000 (e.g., desktop, laptop, tablet, watch, server, hand-held, programmable consumer or industrial electronics, set-top box, game system, compute node, . . . ). The computing device 1000 includes one or more processor(s) 1010, memory 1020, system bus 1030, storage device(s) 1040, input device(s) 1050, output device(s) 1060, and communications connection(s) 1070. The system bus 1030 communicatively couples at least the above system constituents. However, the computing device 1000, in its simplest form, can include one or more processors 1010 coupled to memory 1020, wherein the one or more processors 1010 execute various computer-executable actions, instructions, and or components stored in the memory 1020.

The processor(s) 1010 can be implemented with a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. The processor(s) 1010 may also be implemented as a combination of computing devices, for example, a combination of a DSP and a microprocessor, a plurality of microprocessors, multi-core processors, one or more microprocessors in conjunction with a DSP core, or any other such configuration. In one embodiment, the processor(s) 1010 can be a graphics processor unit (GPU) that performs calculations concerning digital image processing and computer graphics.

The computing device 1000 can include or otherwise interact with a variety of computer-readable media to facilitate control of the computing device to implement one or more aspects of the disclosed subject matter. The computer-readable media can be any available media accessible to the computing device 1000 and includes volatile and non-volatile media, and removable and non-removable media. Computer-readable media can comprise two distinct and mutually exclusive types: storage media and communication media.

Storage media includes volatile and non-volatile, removable and non-removable media implemented in any method or technology for storage of information such as computer-readable instructions, data structures, program modules, or other data. Storage media includes storage devices such as memory devices (e.g., random access memory (RAM), read-only memory (ROM), electrically erasable programmable read-only memory (EEPROM) . . . ), magnetic storage devices (e.g., hard disk, floppy disk, cassettes, tape . . . ), optical disks (e.g., compact disk (CD), digital versatile disk (DVD) . . . ), and solid-state devices (e.g., solid-state drive (SSD), flash memory drive (e.g., card, stick, key drive . . . ) . . . ), or any other like mediums that store, as opposed to transmit or communicate, the desired information accessible by the computing device 1000. Accordingly, storage media excludes modulated data signals as well as that which is described with respect to communication media.

Communication media embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared, and other wireless media.

The memory 1020 and storage device(s) 1040 are examples of computer-readable storage media. Depending on the configuration and type of computing device, the memory 1020 may be volatile (e.g., random access memory (RAM)), non-volatile (e.g., read only memory (ROM), flash memory . . . ), or some combination of the two. By way of example, the basic input/output system (BIOS), including basic routines to transfer information between elements within the computing device 1000, such as during start-up, can be stored in non-volatile memory, while volatile memory can act as external cache memory to facilitate processing by the processor(s) 1010, among other things.

The storage device(s) 1040 include removable/non-removable, volatile/non-volatile storage media for storage of vast amounts of data relative to the memory 1020. For example, storage device(s) 1040 include, but are not limited to, one or more devices such as a magnetic or optical disk drive, floppy disk drive, flash memory, solid-state drive, or memory stick.

Memory 1020 and storage device(s) 1040 can include, or have stored therein, operating system 1080, one or more applications 1086, one or more program modules 1084, and data 1082. The operating system 1080 acts to control and allocate resources of the computing device 1000. Applications 1086 include one or both of system and application software and can exploit management of resources by the operating system 1080 through program modules 1084 and data 1082 stored in the memory 1020 and/or storage device(s) 1040 to perform one or more actions. Accordingly, applications 1086 can turn a general-purpose computer 1000 into a specialized machine in accordance with the logic provided thereby.

All or portions of the disclosed subject matter can be implemented using standard programming and/or engineering techniques to produce software, firmware, hardware, or any combination thereof to control the computing device 1000 to realize the disclosed functionality. By way of example and not limitation, all or portions of the encoder 132 can be, or form part of, the application 1086, and include one or more modules 1084 and data 1082 stored in memory and/or storage device(s) 1040 whose functionality can be realized when executed by one or more processor(s) 1010.

In accordance with one particular embodiment, the processor(s) 1010 can correspond to a system on a chip (SOC) or like architecture including, or in other words integrating, both hardware and software on a single integrated circuit substrate. Here, the processor(s) 1010 can include one or more processors as well as memory at least similar to the processor(s) 1010 and memory 1020, among other things. Conventional processors include a minimal amount of hardware and software and rely extensively on external hardware and software. By contrast, a SOC implementation of a processor is more powerful, as it embeds hardware and software therein that enable particular functionality with minimal or no reliance on external hardware and software. For example, the encoder 132 and/or functionality associated therewith can be embedded within hardware in a SOC architecture.

The input device(s) 1050 and output device(s) 1060 can be communicatively coupled to the computing device 1000. By way of example, the input device(s) 1050 can include a pointing device (e.g., mouse, trackball, stylus, pen, touchpad, . . . ), keyboard, joystick, microphone, voice user interface system, camera, motion sensor, and a global positioning satellite (GPS) receiver and transmitter, among other things. The output device(s) 1060, by way of example, can correspond to a display device (e.g., liquid crystal display (LCD), light emitting diode (LED), plasma, organic light-emitting diode display (OLED) . . . ), speakers, voice user interface system, printer, and vibration motor, among other things. The input device(s) 1050 and output device(s) 1060 can be connected to the computing device 1000 by way of wired connection (e.g., bus), wireless connection (e.g., Wi-Fi, Bluetooth, . . . ), or a combination thereof.

The computing device 1000 can also include communication connection(s) 1070 to enable communication with at least a second computing device 1002 utilizing a network 1090. The communication connection(s) 1070 can include wired or wireless communication mechanisms to support network communication. The network 1090 can correspond to a local area network (LAN) or a wide area network (WAN) such as the Internet. The second computing device 1002 can be another processor-based device with which the computing device 1000 can interact. In one instance, the computing device 1000 can execute an encoder 132 for a first function, and the second computing device 1002 can execute an encoder 132 for a second function in a distributed processing environment. Further, the second computing device can provide a network-accessible service that stores source code, and encryption keys, among other things that can be employed by the encoder 132 executing on the computing device 1000.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications, and variations that fall within the spirit and scope of the appended claims.

What is claimed is:

1. A system for compressing websites for fast data transfers, comprising:
   one or more processors programmed with instructions that, when executed by the one or more processors, cause operations comprising:
   receiving, from a user device, a request to access a website;
   tagging website code subsets corresponding to at least one code type within original website data of the website;
   generating, based on the tagged website code subsets, encoded website data from the original website data by encoding the original website data using a neural network and replacing the tagged website code subsets in the original website data with identifier placeholders associated with local code subsets, the local code subsets being stored at a local system local to the user device; and
   transmitting the encoded website data to the user device via the local system that replaces the identifier placeholders with the local code subsets within the encoded website data before the encoded website data is provided to the user device, wherein the user device decodes the encoded website data to recreate the original website data.

2. The system of claim 1, wherein the local system comprises a content delivery network that replaces the identifier placeholders with the local code subsets within the encoded website data before the encoded website data is provided to the user device.

3. The system of claim 1, further comprising:
   transmitting, to the user device, a decoder configured to decode the encoded website data to recover the original website data.

4. The system of claim 1, wherein the at least one code type comprises HyperText Markup Language (HTML), Cascading Style Sheets (CSS), JQuery, class definition, or a JavaScript library.

5. A method comprising:
   receiving a request for a user device to access a website;
   tagging website code subsets corresponding to at least one code type within website data of the website;
   generating, based on the tagged website code subsets, encoded website data from the website data by encoding the website data using an autoencoder and replacing the tagged website code subsets in the website data with identifier placeholders associated with local code subsets, the local code subsets being stored at a local system local to the user device; and
   transmitting the encoded website data to the user device via the local system that replaces the identifier placeholders with the local code subsets within the encoded website data before the encoded website data is provided to the user device.

6. The method of claim 5, wherein the local system comprises a content delivery network that replaces the identifier placeholders with the local code subsets within the encoded website data before the encoded website data is provided to the user device.

7. The method of claim 5, further comprising:
   transmitting, to the user device, a decoder configured to decode the encoded website data to recover the website data.

8. The method of claim 5, wherein encoding the website data using the autoencoder comprises encoding the website data using a neural network.

9. The method of claim 5, wherein the at least one code type comprises HyperText Markup Language (HTML), Cascading Style Sheets (CSS), JQuery, class definition, or a JavaScript library.

10. The method of claim 5, wherein encoding the website data comprises encoding the website data using one or more protocols corresponding to gzip, bzip2, 7-zip, or PeaZip.

11. The method of claim 5, wherein the website data comprises code for a webpage of the website.

12. A non-transitory computer-readable media storing instructions that, when executed by one or more processors, cause operations comprising:

receiving a request for a user device to access a webpage of a website;

tagging website code subsets corresponding to at least one code type within website data of the website;

generating, based on the tagged website code subsets, encoded website data from the website data by encoding the website data and replacing the tagged website code subsets in the website data with identifier placeholders associated with local code subsets, the local code subsets being stored at a local system local to the user device; and transmitting the encoded website data to the user device via the local system that replaces the identifier placeholders with the local code subsets within the encoded website data before the encoded website data is provided to the user device.

13. The media of claim 12, wherein the local system comprises a content delivery network that replaces the identifier placeholders with the local code subsets within the encoded website data before the encoded website data is provided to the user device.

14. The media of claim 12, further comprising:
   transmitting, to the user device, a decoder configured to decode the encoded website data to recover the website data.

15. The media of claim 12, wherein encoding the website data comprises encoding the website data using an autoencoder.

16. The media of claim 12, wherein encoding the website data comprises encoding the website data using a neural network.

17. The media of claim 12, wherein the at least one code type comprises HyperText Markup Language (HTML), Cascading Style Sheets (CSS), JQuery, class definition, or a JavaScript library.

18. The media of claim 12, wherein encoding the website data comprises encoding the website data using one or more protocols corresponding to gzip, bzip2, 7-zip, or PeaZip.

19. The media of claim 12, wherein the website data comprises code for the webpage of the website.

* * * * *